United States Patent

[11] 3,579,141

| | | |
|---|---|---|
| [72] | Inventor | Masao Miya<br>Tokyo, Japan |
| [21] | Appl. No. | 795,281 |
| [22] | Filed | Jan. 30, 1969 |
| [45] | Patented | May 18, 1971 |
| [73] | Assignee | Nippon Electric Company, Limited<br>Tokyo, Japan |
| [32] | Priority | Feb. 2, 1968 |
| [33] | | Japan |
| [31] | | 43/6603 |

[54] GAS LASER TUBE
5 Claims, 1 Drawing Fig.

[52] U.S. Cl. .................................................. 331/94.5,
313/204, 313/207, 313/220
[51] Int. Cl. ........................................................ H01s 3/22

[50] Field of Search........................................... 313/204,
207, 220; 331/94.5

[56] References Cited
UNITED STATES PATENTS
| | | | | |
|---|---|---|---|---|
| 1,267,827 | 5/1918 | Whitney....................... | | 313/207X |
| 3,437,950 | 4/1969 | Okaya et al.................. | | 331/94.5 |

*Primary Examiner*—Raymond F. Hossfeld
*Attorney*—Hopgood and Calimafde

ABSTRACT: A gas laser device is described wherein a long life is obtained with the employment of a cathode and an anode. A gas filled tube is provided which at oppositely located ends has a cathode and an anode. A short hollow member, preferably of cylindrical shape, is seated on the ends of the gas filled tube. The member is made of a material selected to withstand the bombardment of discharge particles such as positive ions and electrons.

Patented May 18, 1971
3,579,141
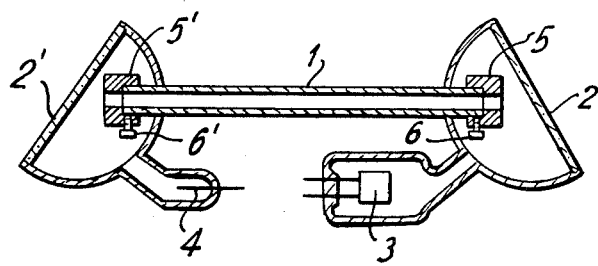
INVENTOR.
MASAO MIYA
BY
Sandoe, Hopgood & Calimafde
ATTORNEYS

GAS LASER TUBE

This invention relates to a gas laser discharge tube capable of operating over a relatively long life.

As is well known, the principal factors determining the useful life of a gas discharge tube are the so-called sputtering and cleanup phenomena. These phenomena involve respectively the sputtering of material from the electrodes and the wall of the discharge tube due to the bombardment by positive ions and electrons, and the decrease in the pressure inside of the tube due to the absorption of the sealed gas by the material deposited on the tube wall and the permeation of the positive ions into the electrode.

Since the sealed gas acts as the active medium for the laser tube, a degradation of the performance of the laser tube arises due to the reduction in the amount of sealed gas. Further lasing performance is deteriorated by a breakdown of the cathode material. A failure in the cathode reduces the electron emission and causes an interruption of the laser oscillation. In order to overcome these difficulties, the conventional laser tube employs a high frequency induced tube discharge without resorting to a cathode, or employs a row of disc-shaped metal elements disposed to form the tube wall with the metal being selected to withstand the ion bombardment. Practically, however, these conventional approaches are not effective because the former requires a high frequency power supply and the latter inevitably and expensively complicates the structure of the discharge tube.

It is therefore an object of the present invention to provide a gas laser tube wherein the sputtering and cleanup phenomena are satisfactorily suppressed.

It is a further object of this invention to provide a gas laser tube having the capability of operating over a long useful life in an economical manner.

The above-mentioned and other features and objects of this invention and the manner of attaining them will become more apparent and the invention itself will best be understood by reference to the following description of an embodiment of the invention taken in conjunction with the accompanying drawings, the description of which follows:

The drawing is an axial sectional schematic view of an embodiment of this invention.

According to the present invention, an improved gas laser tube is provided of the anode-cathode discharge forming type wherein a narrow insulator tube interconnects the cathode and the anode. A short tube made of a material that withstands the bombardment by positive ions and electrons is attached to each end of the insulator tube.

The principle of the present invention will now be explained.

The discharge path of the gas laser tube ranges from the cathode to the anode through a narrow tube portion for laser action. The variation in the electrical potential of the discharge is greatest in the vicinity of the ends of the narrow tube portion i.e. adjacent the anode and cathode. During discharge, a pair of electrons and positive ions diffuse toward the tube wall and disappear due to the recombination. The disappearing pairs of electrons and positive ions should be replaced (for proper discharge equilibrium) by the ionization of gas particles due to their collisions with the electric field accelerated electrons. In the narrow diameter section of the laser tube, the discharge in the narrowed tube wall exhibits a steeper or larger potential gradient, whereas the potential gradient at the two end portions adjacent the Brewster windows is far smaller than that at the narrow diameter section. As a result of the discontinuities presented by the end edges of the narrow diameter tube, and the greater potential gradient at these edges, a significant radial electric field component is produced at these axial end edges.

With the radial electric field greatest in the vicinity of each of the axial end edges of the narrow diameter section, the positive ions and electrons generated in these end edge regions are accelerated towards the narrow tube wall. Hence, rather than diffuse-recombine, the particles under acceleration by the radial electric field impinge upon the narrow tube wall. More precisely, the electrons and positive ions collide against the tube wall at the cathode and anode axial ends of the narrow section, respectively. This bombardment decomposes the insulating material constituting the tube wall. For example, the silicate $SiO_2$, which is the principal constituent of the glass tube wall, is sputtered. It follows that the sputtering and cleanup phenomena determining the life of the gas laser tube occur mainly at the edges of the small diameter section.

The above has been confirmed by long-continued experiments conducted by the inventor. It was observed that those laser tubes which performed for a long period of time and had failed to cause laser oscillations were all substantially or completely contaminated with a brown-colored substance particularly in the vicinity of the end portions of the narrow diameter section.

In the laser discharge tube of this invention, a hollow cylindrical member made of a material that withstands the electron and ion bombardment and has an inner diameter equal to the small diameter portion is attached to each end of the narrow diameter portion, whereby the sputtering and cleanup phenomena are effectively suppressed.

Referring to the drawing, the present laser discharge tube comprises, besides a small diameter section 1, Brewster windows 2 and 2', a cathode 3, an anode 4, a pair of short hollow cylindrical tubes 5 and 5' made of a material that withstands the positive ion and electron bombardment; for example, molybdenum or high purity graphite, and attached by means of the screws 6 and 6' to both ends of the section 1, respectively. The tube 5 and 5' may be attached to the tube ends by any other arbitrary means.

While the principles of the invention have been described in connection with specific apparatus, it is to be clearly understood that this description is made only by way of example and not as a limitation to the scope of the invention as set forth in the objects thereof and in the accompanying claims.

I claim:

1. A gas laser of the anode-cathode discharge type comprising
    a gas-filled tube having at oppositely located ends a cathode and an anode for producing a lasing inducing discharge, and means for absorbing gas discharge generated particles, said particle absorbing means comprising a short tube formed of a material capable of withstanding the bombardment of discharge particles carried by at least one end of said gas-filled tube, said short tube being provided with a bore size to seat on the end of the gas filled tube.

2. The device as recited in claim 1 wherein said short tube is made of a material selected from the group consisting of molybdenum and high purity graphite.

3. A gas laser of the anode-cathode discharge type comprising
    a gas-filled laser tube having at oppositely located ends a cathode and an anode for producing a lasing inducing discharge, and means for absorbing discharge generated particles, said absorbing means comprising
    a pair of short members formed of a material selected to withstand the bombardment of discharge particles such as positive ions and electrons, each of said short members having a bore extending therethrough, said short members being mounted on and extending axially beyond the axial ends of the gas-filled tube, thereby to absorb the bombardment of said particles.

4. The device as recited in claim 3 wherein the bores of said short members are sized to seat said members onto the ends of the gas-filled laser tube.

5. The device as recited in claim 4 wherein said members are cylindrically shaped to fit concentrically over the gas-filled tube.